Figure 1:
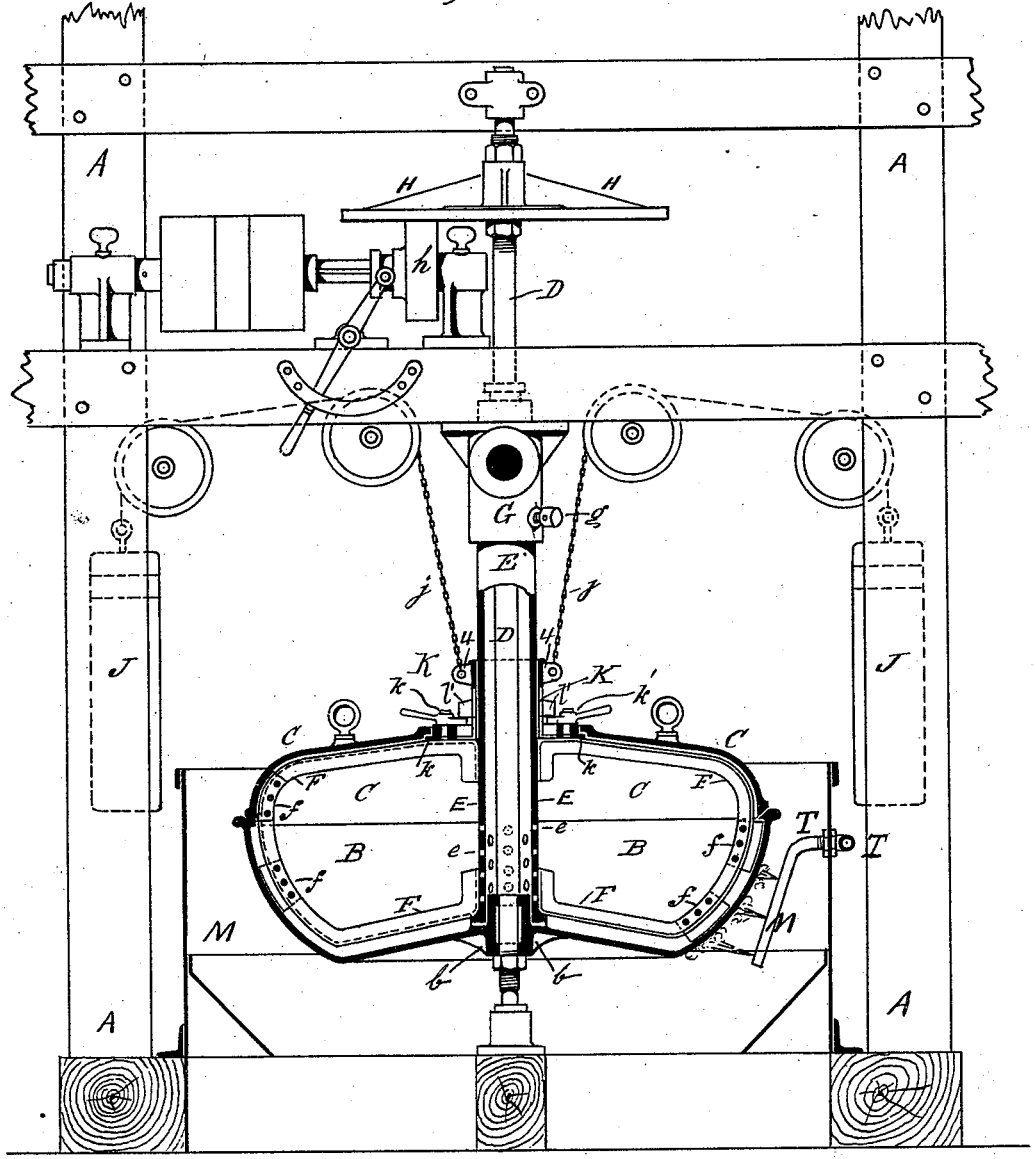

(No Model.) 2 Sheets—Sheet 1.

E. READING & A. RIGBY.
AMALGAMATOR AND SEPARATOR FOR RECOVERING PRECIOUS METALS FROM ORES.

No. 527,076. Patented Oct. 9, 1894.

Witnesses:
E. B. Bolton
S. F. Jones

Inventors:
Edward Reading
Arthur Rigby
By Richards
their Attorneys.

(No Model.) 2 Sheets—Sheet 2.
E. READING & A. RIGBY.
AMALGAMATOR AND SEPARATOR FOR RECOVERING PRECIOUS METALS FROM ORES.
No. 527,076. Patented Oct. 9, 1894.
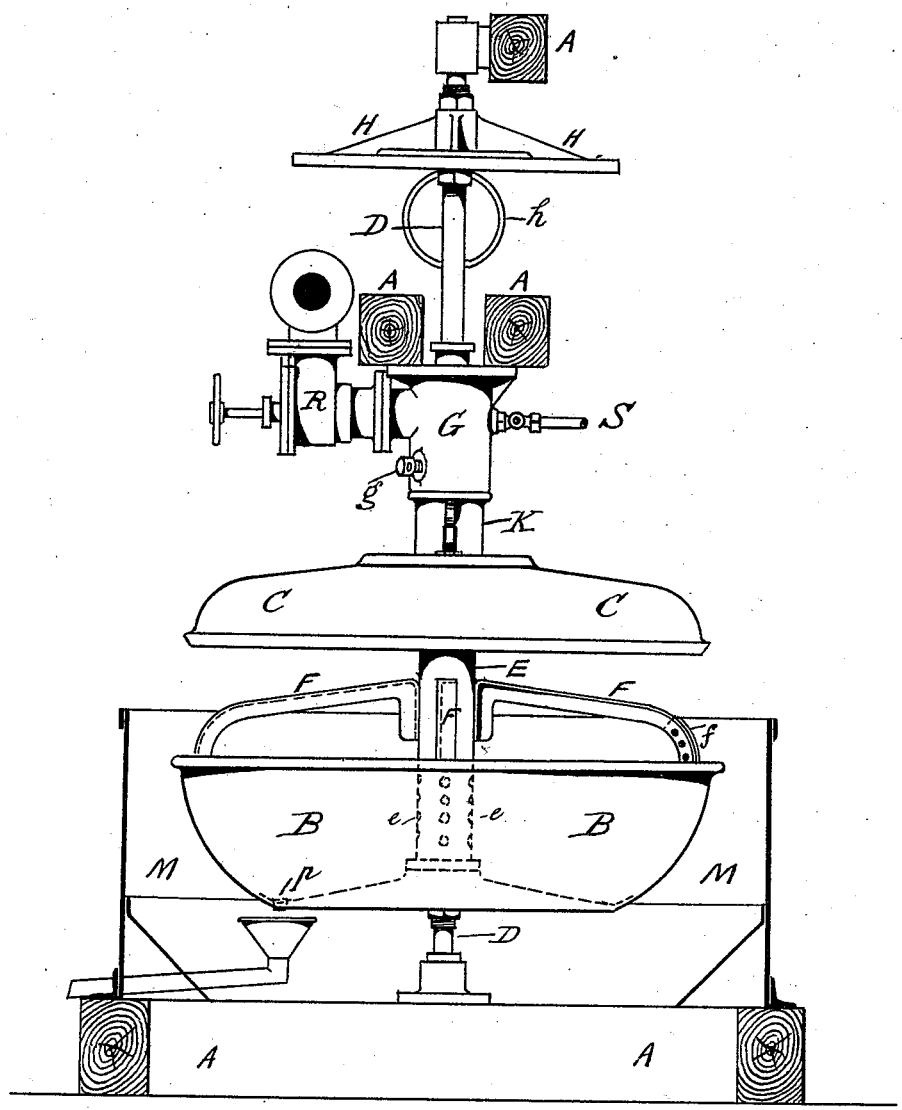

UNITED STATES PATENT OFFICE.

EDWARD READING AND ARTHUR RIGBY, OF SYDNEY, NEW SOUTH WALES.

AMALGAMATOR AND SEPARATOR FOR RECOVERING PRECIOUS METALS FROM ORES.

SPECIFICATION forming part of Letters Patent No. 527,076, dated October 9, 1894.

Application filed March 28, 1892. Serial No. 426,771. (No model.)

*To all whom it may concern:*

Be it known that we, EDWARD READING, dentist, and ARTHUR RIGBY, civil engineer, subjects of the Queen of Great Britain and Ireland, and residents of Sydney, in the Colony of New South Wales, have invented an Improved Amalgamator and Separator for Recovering Precious Metals from their Ores, of which the following is a specification.

This invention consists essentially in a revolving pan having a movable cover and provided with stirrers or scoops whereby the material that is contained in the pan (and which is forced outward toward the periphery of the pan by centrifugal force) shall be continually returned toward the center of the pan, and thereby the amalgamation of the precious metals that are contained in the slime within the pan, with the mercury that is also contained therein shall be more readily effected.

In the accompanying drawings:—Figure 1 is an elevation of the whole apparatus, the pan being in vertical section. Fig. 2 is a side elevation of the same, at right angles to Fig. 1, the lid being raised for the reception of the charge.

A A, is the frame work of the apparatus. B, is the pan and C, is the lid or cover. In the drawings, the pan is shown as rotating upon a vertical axis. This axis is a vertical shaft D, to which the pan is secured in any suitable manner, that shown in the drawings being by means of a boss $b$, that is cast with the pan and which is keyed on the shaft. The vertical shaft rotates within a vertical hollow shaft or pipe E, which acts as a conduit through which water is admitted to the pan, when the latter is in use as a separator. The water flows from the pipe E, into the pan, through the small openings or perforations $e\ e$. The pipe E, also carries radial arms F, which must be of such a shape as to conform to the sectional form or outline of the interior of the pan, as shown in Fig. 1. The radial arms F, are provided with scrapers or scoops $f f$, the edges or lips of which shall very nearly touch the internal surface of the pan B. The scrapers or scoops $f f$, are not placed in exactly the same positions on each arm F, but are so arranged that the slime that passes the scoops on one of the arms shall be caught by one of the scrapers on the other arms. These scoops or scrapers are for the purpose of continually returning the mixture of slime and mercury (that has been forced up the side of the pan by centrifugal action) toward the center, and thus to insure that every particle of the precious metal that is contained in the slime, shall be brought into intimate contact with the mercury in the pan: the object of the above action being to prevent the mercury from remaining in a layer on the internal surface of the side of the pan. The upper end of the pipe E, is carried in a socket bearing G, within which it may rotate freely under the action of the contents when the apparatus is used as a separator, but when the apparatus is used as an amalgamator it is prevented from rotating and rigidly secured to the socket, by means of the set screw $g$.

Rotary motion may be communicated to the pan B, through the shaft D, by any suitable gearing. That shown in the drawings consists of a friction gearing that comprises a horizontal friction disk H, that is secured on the shaft D and that works in contact with a friction wheel $h$, to which rotary motion is communicated. The friction wheel $h$, may be slid, longitudinally along its shaft, so that the speed of rotation of the pan may be varied at will.

The cover C, is raised and lowered by means of the counterbalance weights J, and chains $j$, that are secured to a sleeve K, that slides freely up and down on the hollow shaft E. The cover C, is provided with a central aperture, through which the sleeve K passes. The sleeve K, is provided with a flange $k$, that is of slightly larger diameter than the aperture and underlies it. The flange $k$, is provided with two locking handles $k'\ k'$, which, when the cover is lowered on to the pan, are turned to engage projections $l'\ l'$ on the pipe E extending through slots in the sleeve K and this will secure the sleeve to the pipe E and thereby retain the counterbalance weights J, in their raised positions. This will allow the cover to rotate freely with the pan B, as the cover is not connected to the sleeve K, as the flange $k$ simply underlies the edge of the cover around its central opening. When it is desired to raise the cover C, from the pan B, it will be necessary to ease the handles $k'$, when the counterbalance weights will be released and will fall and thus lift the sleeve into contact with the edge of the aperture in the cover C. The cover may then be raised with but a slight effort to the position shown in Fig. 2.

When the apparatus is to be used as an amalgamator the cover C is raised, and the set screw $g$ eased, which allows the arms F to rotate with the pan.

The lid may be secured to the pan, by any suitable device, such, for instance, as a hasp fastening. The pan B, rotates within a hopper or funnel M, the sides of which may, if desired, be silvered. The water used in separating overflows from the pan into this hopper M. The pan is provided with a plug hole $p$, through which the amalgam is withdrawn from the pan B. In order to assist amalgamation the cock S is provided for the admission of steam or hot water or heated air through the pipe E into the inside of the pan. Steam or heated air is also applied to the outside of the pan by means of the perforated pipe T.

A charge of stuff, together with a sufficient quantity of mercury, having been fed into the pan, the cover C, is lowered on to the pan B, and secured thereto, as above described, and shown in Fig. 1. The stuff that is fed into the pan, should be mixed with a small quantity of water. The pan and cover are then rotated. The result of the rotation will be that the semi fluid stuff that is contained in the pan will be forced by centrifugal force, up the side of the pan, where it will be met by the stationary scoops or scrapers $ff$, in their several positions and returned toward the center of the pan. This is continued until such time as a thorough mixing of the contents of the pan has been effected, amalgamation of course going on the whole time. The rotation of the pan will then be stopped, the cover C, raised, and the set screw $g$, be eased, for the purpose of allowing the arms F, to rotate with the pan. The pan will then be rotated at a slow rate of speed, water at the same time being admitted to the pan down the hollow shaft E. In this way the sand or earthy matters that are contained in the pan are separated from its metallic contents and will pass, with the water over the lip of the pan into the hopper M, leaving the amalgam on the bottom of the pan.

Having now particularly described and ascertained the nature of our said invention and in what manner the same is to be performed, we declare that what we claim is—

1. In apparatus for saving the precious metals from their ores, a rotating pan, that is provided with a removable cover, in combination with a central hollow shaft that is perforated at its lower end, for admitting water into the pan and which carries radial arms, and scrapers $f$ carried by said arms and arranged out of line with each other as herein set forth.

2. In combination with the pan B, the shaft D, the sleeve E the movable cover, the sleeve K and locking means between the cover and the sleeve, substantially as described.

In witness whereof we have hereunto set our hands in presence of two witnesses.

EDWARD READING.
    ARTHUR RIGBY.

Witnesses:
 J. S. WHITELOCKE,
 JAS. T. HUNTER.